(12) United States Patent
Iijima

(10) Patent No.: US 7,334,727 B2
(45) Date of Patent: Feb. 26, 2008

(54) STORE MANAGEMENT SYSTEM

(75) Inventor: Junichi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 974 days.

(21) Appl. No.: 10/102,885

(22) Filed: Mar. 22, 2002

(65) Prior Publication Data

US 2002/0194013 A1 Dec. 19, 2002

(30) Foreign Application Priority Data

Jun. 1, 2001 (JP) ............................. 2001-166930

(51) Int. Cl.
*G06K 15/00* (2006.01)
(52) U.S. Cl. ........................................ 235/383; 705/20
(58) Field of Classification Search ................ 359/334, 359/337.12; 385/24; 398/173; 235/375, 235/383, 385; 705/17, 20, 26
See application file for complete search history.

(56) References Cited

U.S. PATENT DOCUMENTS

| | | | | |
|---|---|---|---|---|
| 5,343,477 A * | 8/1994 | Yamada | ............................ | 714/4 |
| 5,740,075 A * | 4/1998 | Bigham et al. | .............. | 709/229 |
| 6,023,366 A * | 2/2000 | Kinoshita | ............... | 359/337.12 |
| 6,160,477 A * | 12/2000 | Sandelman et al. | .......... | 340/506 |
| 6,317,743 B1* | 11/2001 | Heck | ............................ | 707/10 |
| 6,405,174 B1* | 6/2002 | Walker et al. | ................. | 705/14 |
| 6,452,719 B2* | 9/2002 | Kinoshita | ............... | 359/337.12 |
| 6,564,189 B1* | 5/2003 | Nycz | ............................ | 705/20 |
| 6,592,038 B2* | 7/2003 | Goodwin, III | .......... | 235/462.46 |
| 6,772,096 B2* | 8/2004 | Murakami et al. | ........... | 702/184 |
| 6,891,651 B2* | 5/2005 | Kim et al. | ................... | 359/240 |
| 7,120,686 B2* | 10/2006 | Sasabe et al. | ................ | 709/224 |

FOREIGN PATENT DOCUMENTS

| | | |
|---|---|---|
| JP | 62-065164 | 3/1987 |
| JP | 03-001294 | 1/1991 |
| JP | 6-103233 | 4/1994 |
| JP | 10-312351 | 11/1998 |
| JP | 11-272711 | 10/1999 |
| JP | 2000-207646 | 7/2000 |
| JP | 2000-222363 | 8/2000 |

OTHER PUBLICATIONS

Japanese Office Action issued in priority Japanese Application No. 2002-0029902 dated Dec. 15, 2004.
Korean Office Action issued in priority Korean Application No. 2002-0029902 dated Dec. 15, 2004.

* cited by examiner

*Primary Examiner*—Andrew Joseph Rudy
(74) *Attorney, Agent, or Firm*—Staas & Halsey LLP

(57) ABSTRACT

A store management system executes store operations, employing a communication apparatus In the store, connected with at least one store terminal by way of a first line Inside the store and connected with a server by a second line outside the store. The communication apparatus judges the operation type of each operation request sent from the store terminal and, when the operation type is a first operation, processes the operation request and, when the operation type is a second operation, transmits the operation request to the server so that the server processes the operation request

9 Claims, 7 Drawing Sheets

FIG. 6

PLU DATA

| COMMUNICATION BOX ID | REQUEST NUMBER | TERMINAL ID | PLU | BAR CODE "NUMBER" |
|---|---|---|---|---|

ORDERING DATA

| COMMUNICATION BOX ID | REQUEST NUMBER | TERMINAL ID | ORDERING | COMMODITY ID | QUANTITY ORDERED |
|---|---|---|---|---|---|

SETTLEMENT DATA

| COMMUNICATION BOX ID | REQUEST NUMBER | TERMINAL ID | SETTLEMENT | VALUE OF SALES | QUANTITY OF SALES | AMOUNT OF TAX |
|---|---|---|---|---|---|---|

INSPECTION DATA

| COMMUNICATION BOX ID | REQUEST NUMBER | TERMINAL ID | INSPECTION | COMMODITY ID | QUANTITY INSPECTED |
|---|---|---|---|---|---|

EMPLOYEES' WORK PERFORMANCE DATA

| COMMUNICATION BOX ID | REQUEST NUMBER | TERMINAL ID | EMPLOYEES' WORK PERFORMANCE | EMPLOYEE ID | TIME EMPLOYEE REPORTS FOR WORK | TIME EMPLOYEE LEAVES STORE |
|---|---|---|---|---|---|---|

FIG. 7

PROCESS CONTROL INFORMATION(COMMON FOR BOTH SUBORDINATE OPERATION CONTROL UNIT 24 AND HOST OPERATION CONTROL UNIT 25)

| | TERMINAL ID | REQUEST No | PROCESS TYPE (REQUEST) | PROCESS TIME | OPERATION TYPE | REQUEST CONTENTS | PROCESS RESULT (NO DATA) |
|---|---|---|---|---|---|---|---|
| UP DATA | | | | | | | |
| DOWN DATA | TERMINAL ID | REQUEST No | PROCESS TYPE(REPLY) | PROCESS TIME | OPERATION TYPE | REPLY CONTENTS | PROCESS RESULT (NORMAL CLOSING) |

FIG. 8

CHARGING INFORMATION

| TERMINAL ID | OPERATION TYPE | NUMBER OF CHARGING | AMOUNT OF CHARGES |
|---|---|---|---|

FIG. 9

CHARGE INFORMATION

| OPERATION TYPE | UNIT PRICE FOR USE |
|---|---|

FIG. 10

OPERATION TYPE INFORMATION

| OPERATION TYPE | OPERATION NAME | "TURN-BACK" OR "PASSING" | STORAGE DATA TYPE "STORAGE" OR "NON-STORAGE" |
|---|---|---|---|

STORE MANAGEMENT SYSTEM

BACKGROUND OF THE INVENTION

1. Field of the Invention

The present invention relates to a store management system for providing store management services by a service provider who offers services using a network via a general public line.

2. Description of the Related Art

A store management system that manages stores including retailers comprises a POS system that executes POS (Point of Sales) operations such as commodity sales information management, and a BO system that executes BO (Back Office) operations such as inventory management, ordering management and employee management.

The POS system that stands for point of sales system collects sales information by items to grasp which item was sold, when it was sold and how many pieces of the item were sold, enabling the settlement, accumulation and analysis of sales of each item.

For example, in the POS system the PLU (Price Look Up) operation to obtain commodity prices reads bar codes attached to the price tags of commodity, using a POS terminal such as a bar code reader, a handy terminal or an electronic cash register, and accesses a commodity database called commodity master for the respective bar code information. The commodity database is a database to store commodity information name and sales price of each item, and it is disposed in the headquarters of a retailer. A store office or a center located at a distant place can be used as the headquarters. If the store office is used as the headquarters, the POS terminal and the commodity database are connected together by a LAN. If a center located at a distant place is used as the headquarters, they are connected together by an exclusive line or via the Internet. The commodity database returns the sales information such as the sales price of commodity that corresponds to the received bar code information.

In the BO system, a BO terminal disposed in a store is a computer to input and output commodity inventory data, stock data and data on the times employees report for work and leave the office, for each store. These data are transferred to the headquarters server disposed in the headquarters that executes inventory management, ordering and employee management operations.

Such POS and BO functions can be provided as store management services by a service provider (ASP: Application Service Provider) who offers various services using a network such as the Internet. More specifically, a server on a network that a service provider manages is equipped with merchant database and headquarters server functions, and communicates with POS and BO terminals in a store via its telephone line.

However, it is difficult to provide store management services, such as PLU (Price Look Up) operation executed on a POS terminal for a commodity database that require high-speed response, by network communication using a general public line (telephone line).

If a store uses store management services of a service provider, the store needs to pay the charge to the service provider and the communication charge to a telecommunications company, and there will be a problem of incurring a high communication charge in the case that services such as PLU requiring frequent accesses are used.

SUMMARY OF THE INVENTION

It is therefore the object of the present invention to provide a store management system that makes high-speed response and lowers a communication charge in the case that store management services are provided by a service provider who offers services using a general public line.

To achieve the above object, a service provider (ASP) disposes in a store a communication apparatus that executes part of the store management service operation. The operation that the communication apparatus executes requires high-speed response and/or frequent accesses, and it is not necessary to connect the apparatus to a server managed by the service provider via a pay line. Therefore, it is possible to secure high-speed response and to lower the charge for using the line. Furthermore, according to the present invention, the communication apparatus manages charges imposed for accesses from the store terminal, enabling to charge for even operations that the server does not execute.

In order to achieve the above object, according to an aspect of the present invention there is provided a store management system that executes store operations, comprising a communication apparatus disposed in a store and connected with at least one store terminal by way of a line inside the store; and a server connected with the communication apparatus by way of a line outside the store; wherein the communication apparatus judges the operation type of operation requests sent from the store terminal, and wherein the communication apparatus processes the operation request when the operation type is a first operation, the communication apparatus transmits the operation request to the server so that the server processes the operation request when the operation is a second operation.

Preferably, the communication apparatus manages charges imposed for all the operation requests from the store terminal.

BRIEF DESCRIPTION OF THE DRAWINGS

The above and other objects, aspects, features and advantages of the present invention will become more apparent from the following detailed description when taken in conjunction with the accompanying drawings, in which:

FIG. 6 shows an example of the operation request data;

FIG. 7 shows an example of process control information;

FIG. 8 shows an example of charging information;

FIG. 9 shows an example of rate information; and

FIG. 10 shows an example of operation type information.

DESCRIPTION OF THE PREFERRED EMBODIMENT

A preferred embodiment of the present invention will now be described. It is to be understood however that the technical scope of the present invention is not limited to the embodiment.

Figure 1:
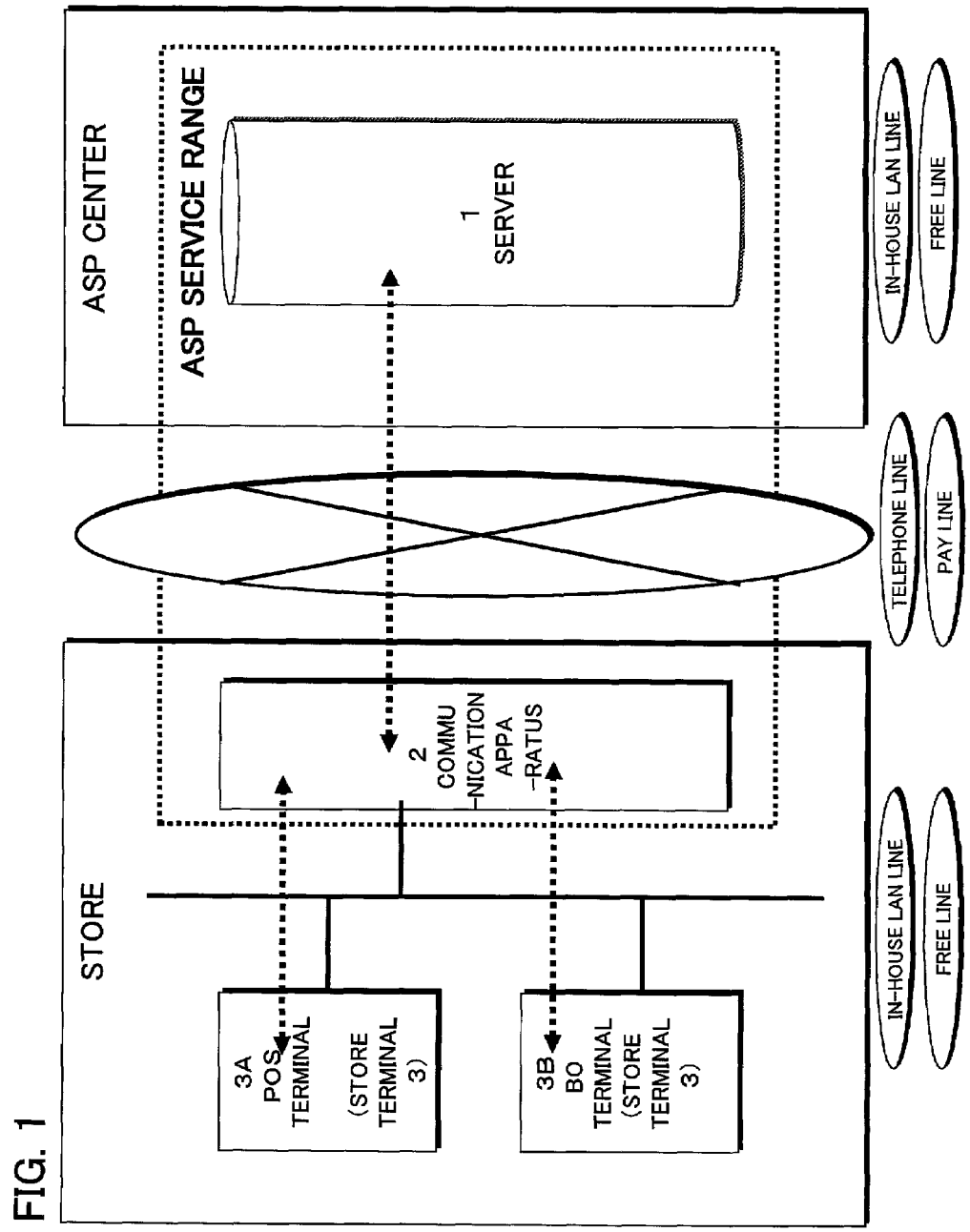
FIG. 1 shows an example of the overall configuration of a store management system in an embodiment of the present invention.

FIG. 1 shows an example of the overall configuration of a store management system in the embodiment of the present invention. In FIG. 1, the service provider (ASP) offers store management operation (POS and BO operations) services, using a server 1 connected to a network and a communication apparatus 2 disposed in the store. The communication apparatus 2 characteristic of this embodiment is connected to the server 1 via the telephone line (line outside the store), a general public line, and communicates with a POS terminal 3A and a BO terminal 3B (hereinafter, may be referred to generically as a store terminal 3) via a LAN (line inside the store).

The communication apparatus 2 executes at least one of the preset store management operations and manages the charge for use imposed on the store, in addition to acting as an intermediary in communication between the store terminal 3 and the server 1.

Figure 2:
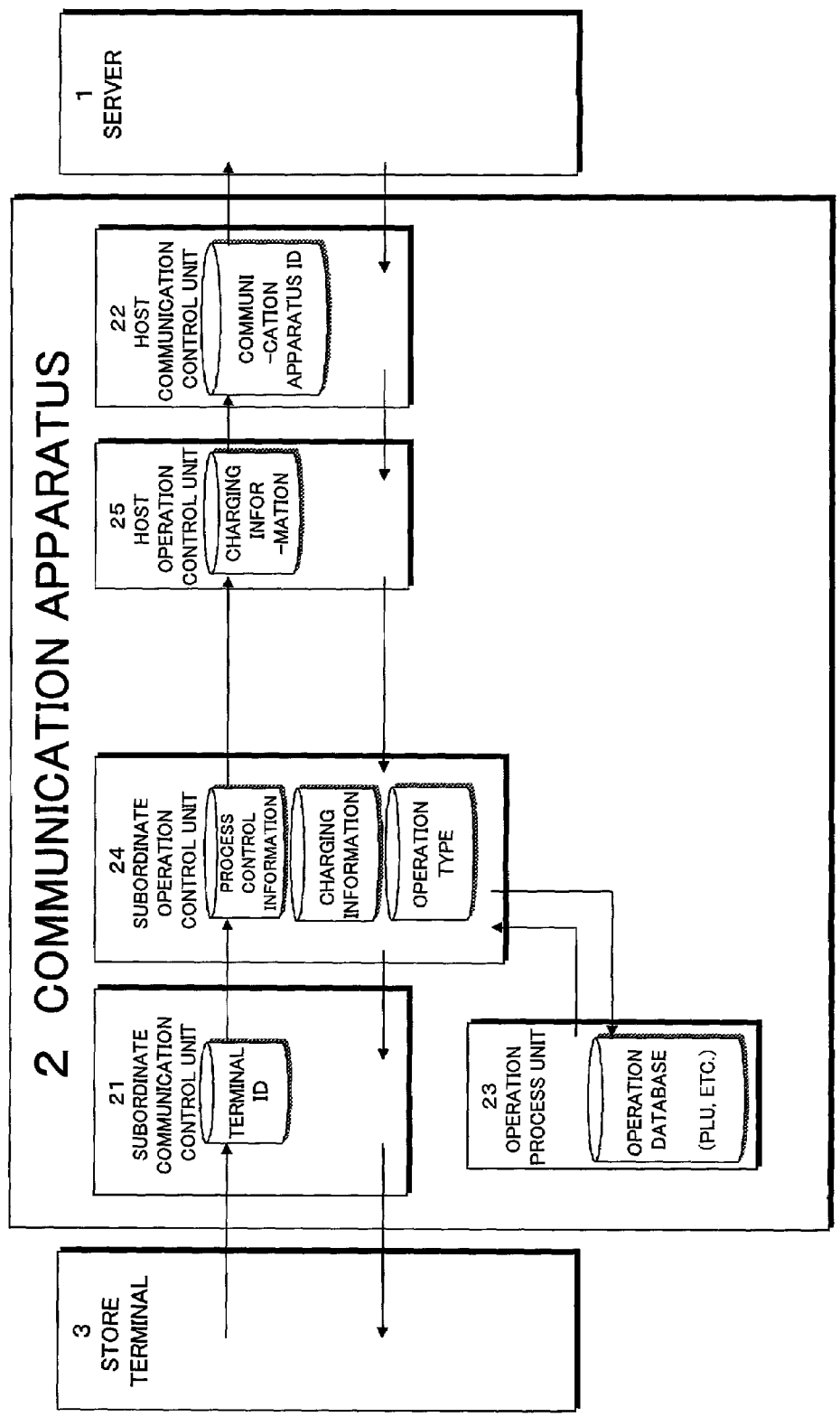
FIG. 2 is a diagram describing an example of the configuration of the communication apparatus 2.

FIG. 2 shows a diagram describing an example of the configuration of the communication apparatus 2. The communication apparatus 2 has a subordinate communication control unit 21 that controls communication with the store terminal 3, a host communication control unit 22 that controls communication with the server 1, an operation processing unit 23 that processes specific operations, a subordinate operation control unit 24 and a host operation control unit 25.

The operation processing unit 23 executes at least one of the preset store management operations. It is desired that an operation that the operation processing unit 23 executes requires frequent accesses and high-speed response, for example the PLU operation. The operation processing unit 23 stores a commodity information database (commodity database) containing the commodity name and price corresponding to commodity bar code information, retrieves the commodity database stored in itself according to the PLU (Price Look Up) access from the POS terminal 3A and returns the result data (commodity information). As a result, the PLU operation is executed by the communication apparatus disposed in the store without transmitting PLU accesses to the server 1 via the telephone line, and therefore, communication charge (charge for using the line) is not incurred and high-speed response can be made.

The charge for the services provided by a service provider is imposed on the basis of the amount of communication data between the store terminal 3 and the server 1, and in general, the server 1 manages the amount of communication data. In this embodiment, however, the communication apparatus 2 executes part of the operations and the server 1 does not accept some accesses from the store terminal 3. In this embodiment, therefore, the communication apparatus 2 disposed in the store needs to manage the charging for use.

Figure 3:
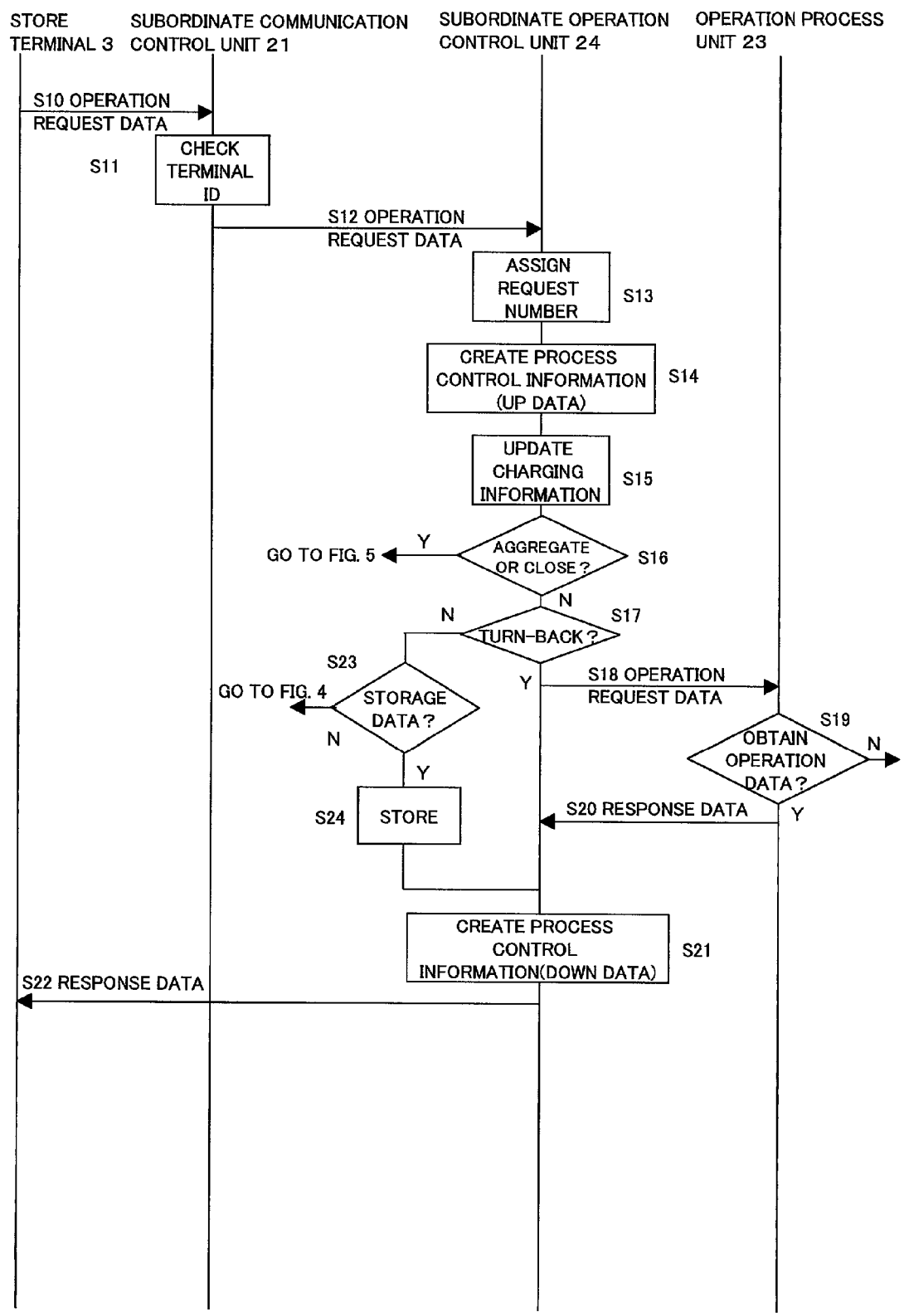
FIG. 3 is a process flowchart of the store management system in the embodiment of the present invention.
Figure 4:
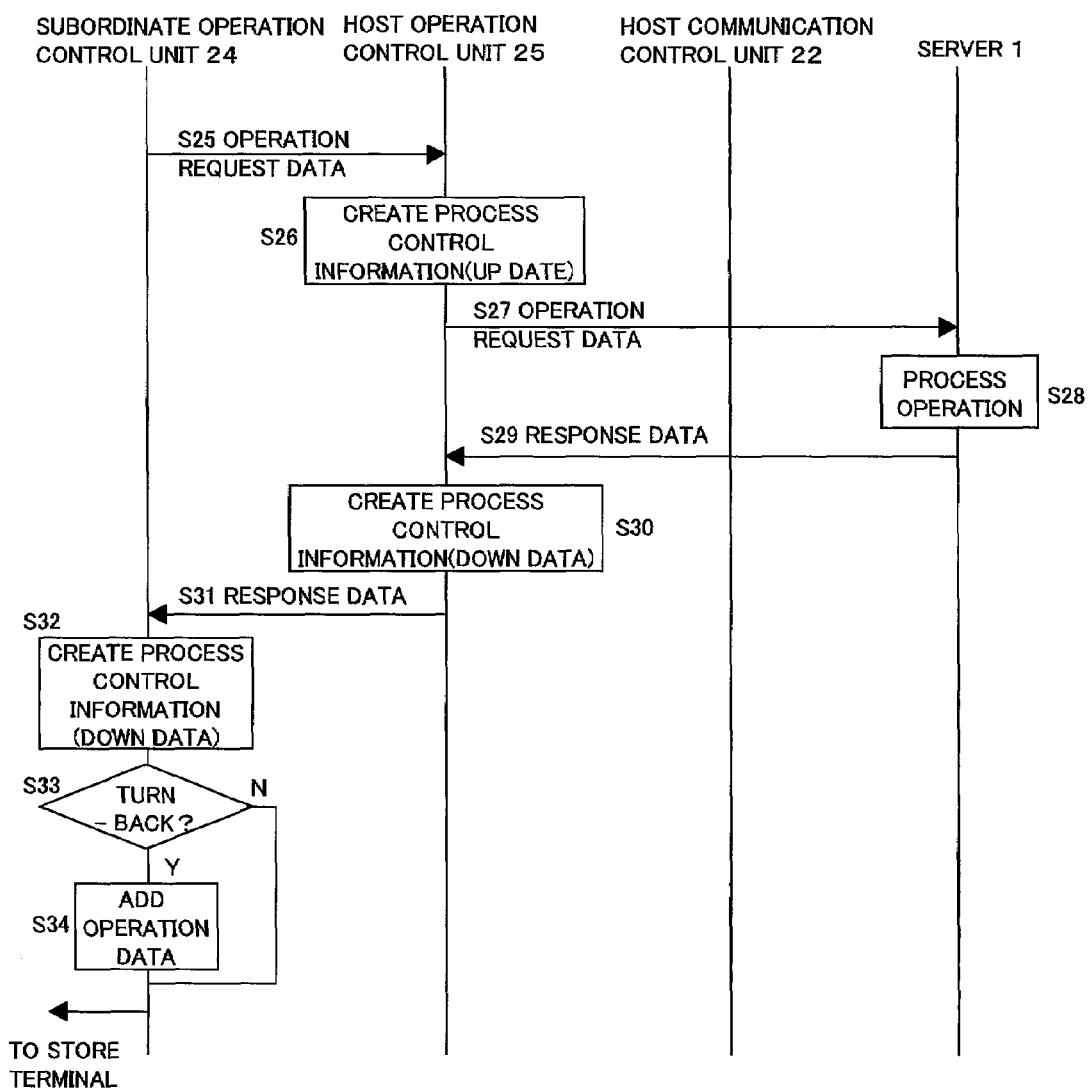
FIG. 4 is a process flowchart of the store management system in the embodiment of the present invention.
Figure 5:
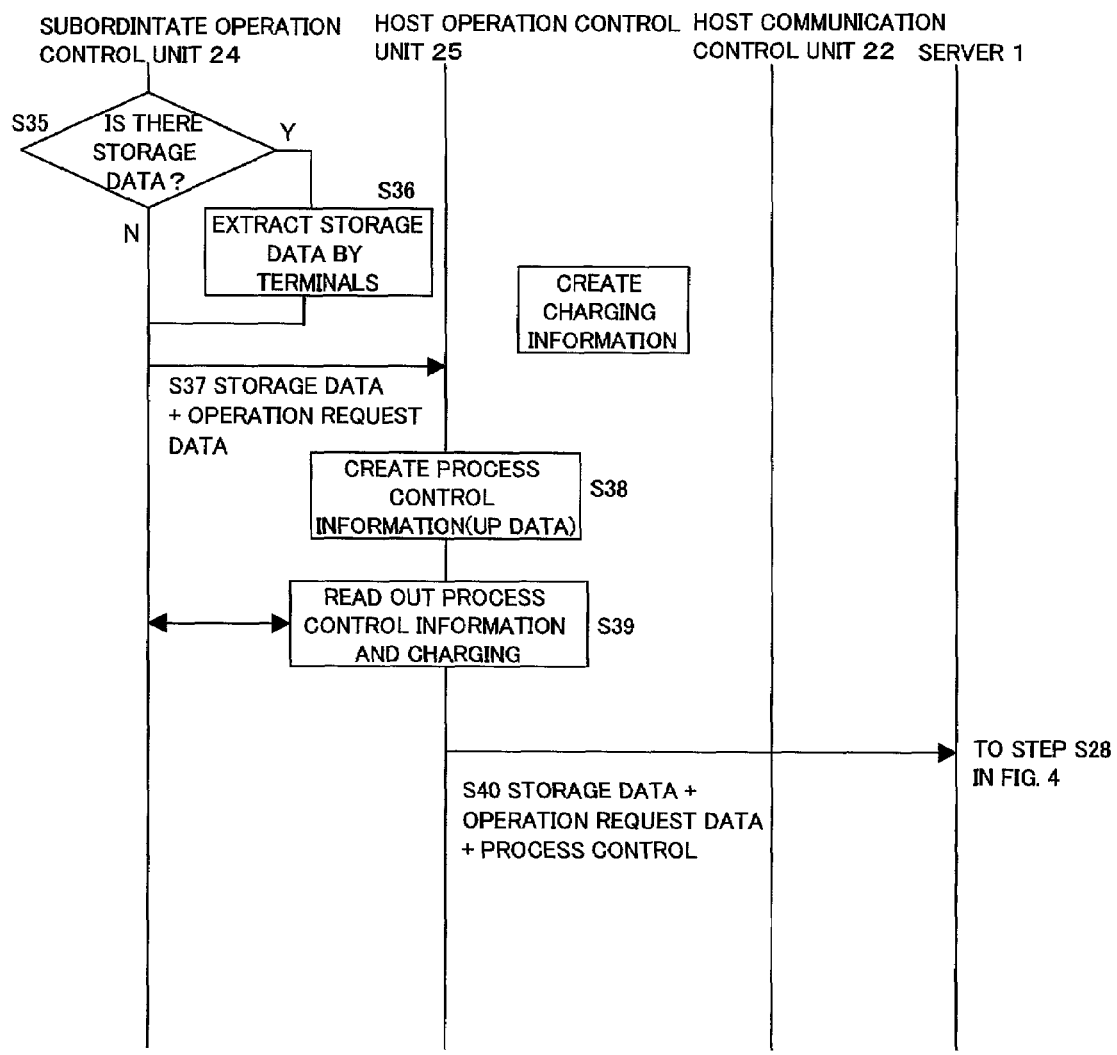
FIG. 5 is a process flowchart of the store management system in the embodiment of the present invention.

FIGS. 3, 4 and 5 are flowcharts to process the store management system in the embodiment of the present invention. In FIG. 3, the store terminal 3 transmits specific operation request data (S10). FIG. 6 shows an example of the operation request data. The operation request data contains terminal ID, operation type and request contents. The terminal ID is information to identify the store terminal 3 and the operation type is information to identify the type of operation such as "PLU", "ordering", "inspection", "settlement" and "employees' work performance" while the request contents are data corresponding to each operation type. For example, if the operation type is PLU, the request contents are commodity bar code information, and if the operation type is ordering, the request contents are commodity ID and the quantity of orders. FIG. 6 shows the operation request data with request number and communication apparatus ID that is described later.

The subordinate communication control unit 21 receives operation request data. The subordinate communication control unit 21 is provided with a terminal ID database of pre-registered store terminals 3 and check if the terminal ID contained in the received operation request data is a registered terminal ID (S11). After checking, the subordinate communication control unit 21 forwards the operation request data to the subordinate operation control unit 24 (S12). The subordinate operation control unit 24 assigns an exclusive request number to the received operation request data (S13) and prepares process control information (S14).

FIG. 7 is a diagram of the process control information. As shown in FIG. 7, the process control information is information to manage the process status of each operation request, and contains terminal ID, operation type and request contents (or response contents) carried in each operation request data as well as the assigned request number, process type, process time and process result. The process control information comprises a pair of inbound and down data. The up data is prepared when operation request data is received from the store terminal 3, while the down data is prepared when response data is returned to the store terminal 3. When the process for each operation request data is completed, a pair of inbound and down data becomes available. In this way, the process control information can also be used as process hysteresis data.

The "process type" of up data prepared when operation request data is received from the subordinate communication control unit 21 is, for example, "request" and the "process time" is the time when the operation request data is received. As the operation is not processed yet at the time when the operation request data is received, the "process result" is blank (no data).

The subordinate operation control unit 24 prepares process control information (up data) and then updates charging information (S15).

FIG. 8 shows an example of the charging information. As shown in FIG. 8, the charging information is information on the accumulation of the number of charging and the amount of charges for each operation. FIG. 9 shows an example of rate information. The unit price for using each operation is preset in the rate information. The subordinate operation control unit 24 increases by 1 the number of charging for the charging information corresponding to the operation type in the operation request data with regard to the charging information of the store terminal 3 that transmitted the operation request data each time process control information is prepared at Step 14, and adds the unit price for use indicated in FIG. 9.

Then, the subordinate operation control unit 24 judges whether the operation is the "settlement" or "closing" operation (S16). The settlement operation is an operation the POS terminal executes to make the settlement for the day after the store is closed, and the closing operation is an operation the BO terminal executes to end the operations of the day. In the case of the settlement or closing operation, the store management procedure moves to the process in FIG. 5 described later. If not, the subordinate operation control unit 24 judges whether the operation type is the "turn-back" operation (S17). A plurality of operations provided by a service provider are classified into the "turn-back" or "passing" operation. The "turn-back" operation is an operation that the communication apparatus 2 executes, for example, the PLU operation. The "passing" operation is an operation that the server 1 executes, for example, ordering and employee management operations.

FIG. 10 shows an example of operation type information. The operation type information in FIG. 10 is provided with the operation name ("PLU", "ordering", settlement", etc.) corresponding to the operation type (code information) and identification information (turn-back type) for the "turn-back" and "passing" operations. The operation type information contains stored data type for each operation type. The stored data type is information to identifies whether operation request data sent from the store terminal 3 should be transmitted immediately to the server 1 (non-storage), or should be stored temporarily in the communication apparatus 2 to be transmitted at a stretch when the settlement is made (storage), if the operation type is the "passing" operation. The operation request data to be "stored" may be called storage data hereinafter.

For example, among "passing" operations, the "ordering" and "employee management" operations can be processed after the store closes its operations, and thus, they are the "storage" operations, while the "inventory check" operation is the "non-storage" operation as it requires immediate reply. The "turn-back" operation can be classified as the "non-storage" operation for smooth data management, although it does not require the setting of the storage data type.

The operation process unit 23 obtains operation data corresponding to the operation request data (S19). For example, in the PLU operation, the operation process unit 23 retrieves the commodity database and obtains commodity information (commodity name and sales price) corresponding to the commodity bar code information contained in the operation request data. Steps taken if no corresponding operation data is found at Step S19 are described later. When obtaining the corresponding operation data, the operation process unit 23 forwards the operation data to the subordinate operation control unit 24 (S20). When receiving the operation data, the subordinate operation control unit 24 prepares down data for process control information (S21). The "process type" of the down data is, for example, "reply" and "normal closing" is recorded in the "process result" section. The subordinate operation control unit 24 returns the operation data as response data to the store terminal 3 via the subordinate communication control unit 21 (S22).

If no corresponding operation data is found at Step S19, for example, in the PLU operation, commodity information on new items registered in the server 1 is not yet registered in the operation database stored in the operation process unit 23 of the communication apparatus 2. In that case, the subordinate operation control unit 24 forwards the operation request data to the host operation control unit 25 to conduct the same process as the "passing" operation as described below, although the PLU operation is regarded as a "turn-back" operation.

If the operation is regarded as a "passing" operation at Step S17, it is judged further whether it is a "storage" operation (S23). If it is a "storage" operation, the subordinate operation control unit 24 stores the received operation request data temporarily (S24) and prepares the down data for process control information (S21). The "process result" section in this case is marked with, for example, "storage completion." Then, the subordinate operation control unit 24 returns a storage completion notice as response data to the store terminal 3 via the subordinate communication control unit 21 (S22).

If the operation is regarded as a "non-storage" operation at Step S23, the process moves to FIG. 4 and the subordinate operation control unit 24 assigns the request number to the operation request data and forwards it the host operation control unit 25 (S25). When receiving the operation request data, the host operation control unit 25 prepares process control information (up data) similar to the process control information (up data) prepared by the subordinate operation control unit 24 (S26), and transmits the operation request data to the server 1 via the host communication control unit 22 (S27). At the same time, the host operation control unit 22 assigns the communication apparatus ID to the operation request data and transmits it to the server 1.

When receiving the operation request data, the server 1 executes the specified process corresponding to the operation request data (S28) and returns response data (S29). When receiving the response data (normal process termination and/or operation data) from the server 1 via the host communication control unit 22, the host operation control unit 25 prepares down data ("normal completion" for the process result) for process control information (S30). Then, the host operation control unit 25 forwards the response data to the subordinate operation control unit 24 (S31), and the subordinate operation control unit 24 prepares down data for process control information like the host operation control unit on the basis of the reception of the response data (S32). After that, the subordinate operation control unit 24 returns the response data to the store terminal 3 via the subordinate communication control unit 21, as described at Step S22 in FIG. 3. When receiving the response data from the host operation control unit 25, the subordinate operation control unit 24 checks if the operation corresponding to the response data is a "turn-back" operation (S33). As described above, if operation request data is transmitted to the server 1 with no corresponding data existing in the operation control unit 23 although it is a "turn-back" operation, the subordinate operation control unit 24 stores the operation data in the operation database of the operation process unit 23 because the response data contains the operation data (S34). By this method, if the same operation request data is received next time, the operation can be processed as a "turn-back" process.

If the operation is regarded as "settlement" or "closing" at Step S16, the process in FIG. 5 is executed. More specifically, the subordinate operation control unit 24 checks if there is operation request data (storage data) stored at Step 24 in FIG. 3 (S35), and if so, it extracts storage data on the store terminal that transmitted the operation request data corresponding to the settlement or closing operation (S36). The subordinate operation control unit 24 forwards the extracted storage data and the operation request data corresponding to the settlement or closing operation, to the host operation control unit 25 (S37).

The host operation control unit 25 prepares up data for process control information on all the received operation request data (S38), and reads out process control information and charging information stored in the subordinate operation control unit 24 corresponding to the terminal ID of the store terminal 3 that requested the settlement or closing operation, on the basis of the operation request data corresponding to the settlement or closing operation (S39). The information to be read out follows the information read out when the previous settlement is made. Then, the host operation control unit 25 transmits the operation request data corresponding to the settlement or closing operation, the read out process control information and charging information, and the storage data extracted at Step S36, to the server 1 via the host communication control unit 22 (S40). The processes following Step S40 are the same as the steps from S28 to S34 in FIG. 4. More specifically, the server 1 executes the settlement operation on the basis of the operation request data corresponding to the settlement or closing operation, according to the received process control information and charging information, executes processes for each storage data and returns the response data on the respective processes.

In the above embodiment, the subordinate operation control unit 24 prepares process control information on all the operation request data sent from the store terminal 3, and manages the charging information. On the other hand, the host operation control unit 25 prepares process control information on the operation of forwarding operation request data to server 1. Therefore, the process control information on the operation of forwarding operation request data to the server 1 is prepared in duplicate by the subordinate operation control unit 24 and the host operation control unit 25.

It is assumed that because a general public line (telephone line) is used to connect the communication apparatus 2 and the server 1, response data is not returned due to jamming even if operation request data is sent from the communication apparatus 2 to the server 1. If the host operation control unit 25 does not receive response data after the specified time has elapsed, it needs to execute the response data reception control process such as re-sending the operation request data. To do so, it is desirable to separately manage process control information on the operation of forwarding the operation request data to the server 1. This embodiment, however, does not eliminate the integration the subordinate operation control unit 24 and the host operation control unit 25.

In the embodiment of the present invention, a service provider (ASP) who possesses the server 1 to offer services on a network installs the communication apparatus 2 on the store side. Operations requiring high-speed response and/or frequent accesses are regarded as "turn-back" operations that are processed not by the server 1 but by the communication apparatus 2. In this way, high-speed response to operation request data can be guaranteed while communication charges for using a public line can be reduced. In this case, it is not necessary on the store terminal side to check which processes the operation request—the server 1 or the communication apparatus 2.

In the embodiment of the present invention, the communication apparatus 2 manages process control information on all the operation request data sent from the store terminal 3. By this method, the charge is imposed for operations ("turn-back" operation) that are not processed by the server 1.

Changes of the various settings (changes or addition of operation type, etc.) for the communication apparatus 2 can be made in compliance with the instructions from the sever 1.

According to the present invention, when a service provider (ASP) who offers service using a server on a network provides store management services, a communication apparatus to be disposed in the store is provided. The communication apparatus executes part of the operation to be executed primarily by the server, and manages the charging information for using the services. The operations that the communication apparatus executes require high-speed response and/or frequent accesses. The communication apparatus does not need to be connected with the server operated by the service provider via a line, enabling the store to secure the high-speed response and to reduce the charge for using the line. Furthermore, in the present invention, the communication apparatus manages the charging for accesses from the store terminal, enabling the store to account the operations that the server does not execute.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art. The protective scope of the present invention is not limited to the above embodiment but covers the invention defined by following claims and its equivalents.

What is claimed is:

1. A store management system that executes store operations, comprising:

a communication apparatus disposed in a store and connected with at least one store terminal by way of a line inside the store; and a server connected with the communication apparatus by way of a line outside the store; wherein:

the communication apparatus judges an operation type of each operation request sent from the store terminal, and when the operation type is a first operation, which will not be processed by the server, the communication apparatus processes the operation request, when the operation type is a second operation, which will be processed by the server, the communication apparatus transmits the operation request to the server so that the server processes the operation request, the first operation includes at least a price look up (PLU) operation, and the second operation includes at least a settlement operation or an ordering operation, the communication apparatus creates and accumulates process control information to manage the process status of each operation request with respect to all the operation requests from the store terminal, and the communication apparatus manages charges imposed for, all the operating requests from the store terminal.

2. The store management system according to claim 1, wherein the first operation is an operation that requires high-speed response to the store terminal for the operation request process, compared with the second operation.

3. The store management system according to claim 1, wherein the line inside the store is a free line, the line outside the store is a pay line, and the free line provides a higher communication speed than the pay line.

4. The store management system according to claim 1, wherein the communication apparatus calculates the amount of charges for each store terminal, based on the unit price for processing each operation request from each store terminal and on the number of the operation requests by each store terminal, and accumulates charging information including the amount of charges imposed.

5. The store management system according to claim 1, wherein the communication apparatus transmits the accumulated process control information to the sewer, based on a specific operation request from each store terminal.

6. The store management system according to claim 4, wherein the communication apparatus transmits the accumulated charging information to the server, based on a specific operation request from each store server.

7. The store management system according to claim 5, wherein the specific operation request is a settlement operation request in case the store terminal is a POS terminal.

8. The store management system according to claim 1, wherein the first operation is an operation accessed from the store terminal more frequently, compared with the second operation.

9. The store management system according to claim 8, wherein the first operation is a PLU (Price Look Up) operation that returns the commodity name and price to the store terminal on the basis of the commodity identification information contained in the operation request.

* * * * *

UNITED STATES PATENT AND TRADEMARK OFFICE
CERTIFICATE OF CORRECTION

PATENT NO. : 7,334,727 B2  Page 1 of 1
APPLICATION NO. : 10/102885
DATED : February 26, 2008
INVENTOR(S) : Junichi Iijima It is certified that error appears in the above-identified patent and that said Letters Patent is hereby corrected as shown below:

First Page, Column 2 (Abstract), Line 2, after "apparatus" change "In" to --in--.

First Page, Column 2 (Abstract), Line 4, change "Inside" to --inside--.

First Page, Column 2 (Abstract), Line 10, after "request" insert --.--.

Column 8, Line 40, after "for" delete ",".

Column 8, Line 40, change "operating" to --operation--.

Column 8, Line 59, change "sewer" to --server--.

Signed and Sealed this

Twelfth Day of August, 2008

JON W. DUDAS
*Director of the United States Patent and Trademark Office*